(12) United States Patent
Umehara

(10) Patent No.: US 9,320,004 B2
(45) Date of Patent: Apr. 19, 2016

(54) COMMUNICATION APPARATUS, CONTROL METHOD FOR COMMUNICATION APPARATUS, AND STORAGE MEDIUM STORING PROGRAM

(71) Applicant: CANON KABUSHIKI KAISHA, Tokyo (JP)

(72) Inventor: Makoto Umehara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 13/785,303

(22) Filed: Mar. 5, 2013

(65) Prior Publication Data

US 2013/0237259 A1    Sep. 12, 2013

(30) Foreign Application Priority Data

Mar. 7, 2012  (JP) ................................. 2012-050683

(51) Int. Cl.
*H04W 60/00* (2009.01)
*H04L 29/08* (2006.01)
*H04W 4/02* (2009.01)

(52) U.S. Cl.
CPC ........... *H04W 60/00* (2013.01); *H04L 67/2814* (2013.01); *H04W 4/023* (2013.01); *H04L 67/2828* (2013.01)

(58) Field of Classification Search
USPC .......................... 455/500, 513, 67.11, 69, 517
See application file for complete search history.

(56) References Cited

U.S. PATENT DOCUMENTS

| | | | | |
|---|---|---|---|---|
| 5,655,217 A * | 8/1997 | Lemson | ............... | H04B 7/0837 455/450 |
| 7,701,935 B2 * | 4/2010 | Fukuzawa | ............. | H04W 40/18 370/389 |
| 7,945,215 B2 * | 5/2011 | Tang | ..................... | H04W 72/02 455/501 |
| 8,761,041 B2 * | 6/2014 | Tamaki | ................. | H04W 24/02 370/253 |
| 8,804,600 B2 * | 8/2014 | Suda | ...................... | H04B 7/155 370/315 |
| 2004/0171352 A1 * | 9/2004 | Maeda | ..................... | H04B 1/10 455/67.13 |
| 2005/0197121 A1 * | 9/2005 | Fujiwara | ............... | H04W 60/00 455/435.1 |
| 2006/0121951 A1 * | 6/2006 | Perdomo | ........... | H04M 1/72513 455/572 |
| 2008/0030265 A1 * | 2/2008 | Ido | ........................ | H04L 5/0023 329/317 |
| 2008/0080429 A1 * | 4/2008 | Hart | ....................... | H04W 64/00 370/332 |
| 2010/0229216 A1 * | 9/2010 | Koga | .................... | H04W 12/06 726/3 |
| 2011/0051642 A1 * | 3/2011 | Krishnaswamy | ..... | H04W 40/10 370/311 |
| 2012/0003940 A1 * | 1/2012 | Hirano | .............. | H04W 74/0816 455/67.13 |

FOREIGN PATENT DOCUMENTS

JP    11-46380 A    2/1999
JP    2002-305717 A    10/2002

(Continued)

*Primary Examiner* — Edward Urban
*Assistant Examiner* — Ralph H Justus
(74) *Attorney, Agent, or Firm* — Canon U.S.A., Inc. IP Division

(57) ABSTRACT

A communication apparatus includes a detection unit configured to detect received powers of a plurality of radio signals received during a first predetermined time period from another apparatus, and a transmission unit configured to transmit by proxy identification information of the another apparatus using a detection result by the detection unit as at least one condition.

20 Claims, 9 Drawing Sheets

(56) References Cited

FOREIGN PATENT DOCUMENTS

| | | |
|---|---|---|
| JP | 2005-086570 A | 3/2005 |
| JP | 2005-341171 A | 12/2005 |
| JP | 2006-157957 A | 6/2006 |
| JP | 2007-208955 A | 8/2007 |
| JP | 2007-243756 A | 9/2007 |
| JP | 2007-251475 A | 9/2007 |
| JP | 2009-060362 A | 3/2009 |
| JP | 2009-189018 A | 8/2009 |
| JP | 2011-029990 A | 2/2011 |

* cited by examiner

FIG.4

| RECEIVED IDENTIFICATION INFORMATION | RECEIVED POWER | RECEIVED POWER CHANGE AMOUNT |
|---|---|---|
| TERMINAL B | -40dBm | 0dBm/sec |
| TERMINAL C | -50dBm | -2dBm/sec |
| TERMINAL D | -57dBm | 0dBm/sec |
| TERMINAL E | -60dBm | 0dBm/sec |
| TERMINAL F | -65dBm | -4dBm/sec |
| TERMINAL G | -66dBm | -4dBm/sec |

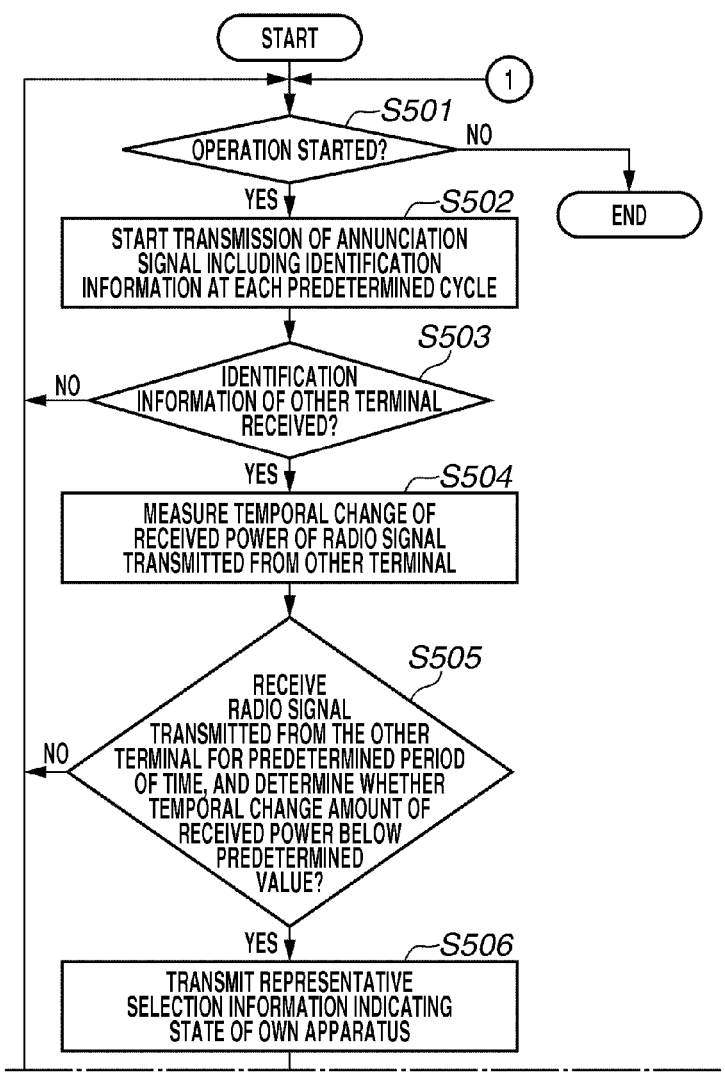

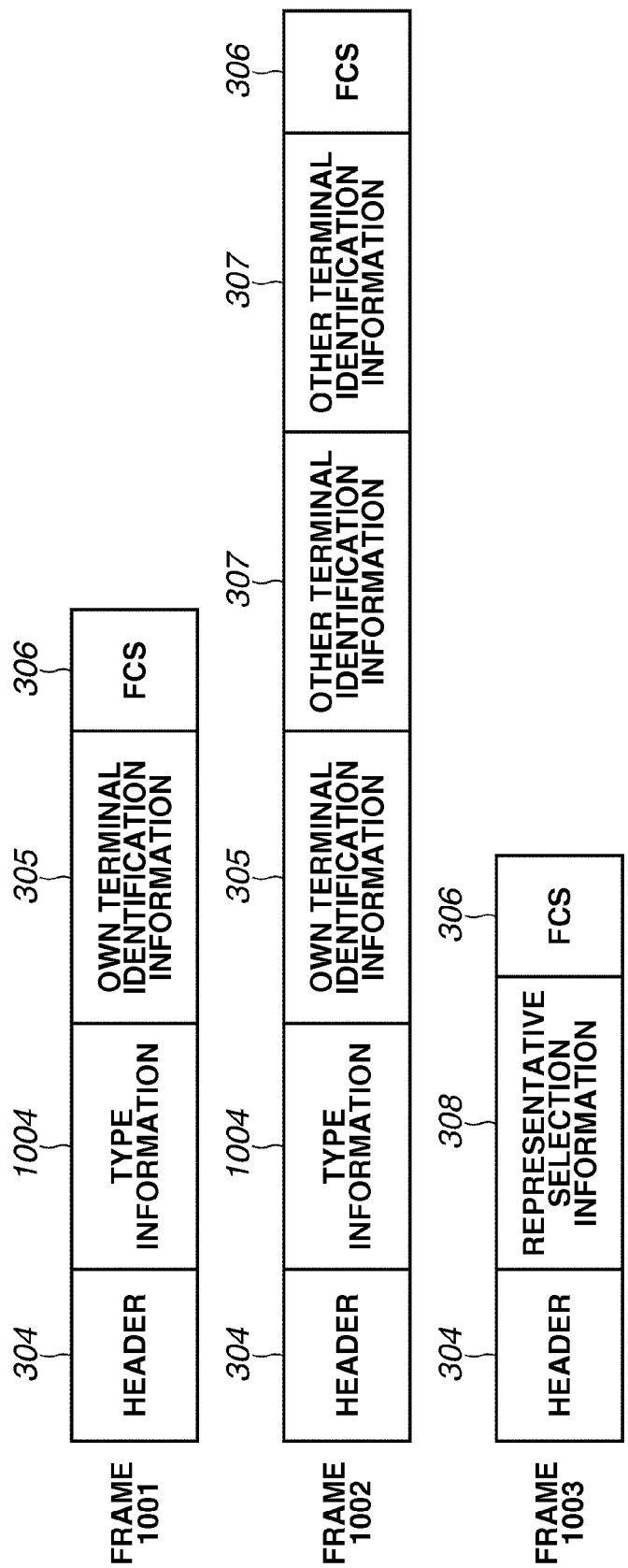

FIG.7

| RECEIVED IDENTIFICATION INFORMATION | RECEIVED POWER | RECEIVED POWER CHANGE AMOUNT | TYPE INFORMATION |
|---|---|---|---|
| TERMINAL A | -47dBm | 0dBm/sec | 1 |
| TERMINAL B | -45dBm | 0dBm/sec | 1 |
| TERMINAL C | -35dBm | -2dBm/sec | 1 |
| TERMINAL E | -38dBm | 0dBm/sec | 2 |
| TERMINAL F | -55dBm | -4dBm/sec | 3 |
| TERMINAL G | -56dBm | -4dBm/sec | 3 |

COMMUNICATION APPARATUS, CONTROL METHOD FOR COMMUNICATION APPARATUS, AND STORAGE MEDIUM STORING PROGRAM

BACKGROUND OF THE INVENTION

1. Field of the Invention

Aspects of the present invention generally relate to a communication apparatus.

2. Description of the Related Art

In recent years, mobile terminal apparatuses such as cameras and mobile phones having wireless communication functions are in widespread use. Along with a widespread use of the mobile terminal apparatuses, a control load of a base station that controls the mobile terminal apparatuses has become an issue. As a technique for reducing such a control load of the base station, Japanese Patent Application Laid-Open No. 11-46380 discusses a system in which a mobile station performs, with respect to a base station, position registration operations of mobile terminal apparatuses that exist in the mobile station such as a train or a bus as a representative of the mobile terminal apparatuses. As another technique for collectively transmitting information of other devices by a certain device, Japanese Patent Application Laid-Open No. 2007-243756 discusses a system in which a representative device is selected from among a plurality of devices connected to a network based on a device performance, and the representative device collectively transmits information of peripheral devices.

On the other hand, in recent years, the augmented reality (AR) technology has been available which displays a captured image captured by a camera or the like by combining with attribute information of an object in the captured image. As a camera utilizing the AR technology, Japanese Patent Application Laid-Open No. 2002-305717 discusses an imaging apparatus which performs facial recognition processing on a captured image using face information obtained from a mobile information device or the like, and displays information concerning a specified person combined with the captured image.

If a certain device collectively transmits information pieces of other devices as discussed in Japanese Patent Application Laid-Open No. 11-46380 or No. 2007-243756 to the AR system discussed in Japanese Patent Application Laid-Open No. 2002-305717, it is conceivable that efficiency of wireless communication bands to be used for notifying information such as face information is improved.

However, according to Japanese Patent Application Laid-Open No. 11-46380, a predetermined device included in the mobile station transmits information collectively in an environment such as in the mobile station in which movement is restricted for a certain period of time such as in a train or bus. Further, according to Japanese Patent Application Laid-Open No. 2007-243756, devices connected to an indoor network autonomously operate to select a representative device which transmits information as a representative of the devices. In other words, in the conventional techniques, a configuration for another mobile terminal apparatus to collectively transmit information pieces sent out from mobile terminal apparatuses carried by an owner and movable without restriction is not taken into consideration.

For example, assuming a case in which owners of mobile terminal apparatuses receive information concerning a partner apparatus at a moment when they pass each other. Between the apparatuses which are moving such that mutual relative positions are separated away from each other, a distance increases with time. Even if either one of such apparatuses transmits by proxy information of the other apparatus together with information concerning its own apparatus, it is feared that yet another apparatus which receives proxy transmission cannot make use of the information transmitted by proxy.

For example, in the above-described AR system, supposing a camera receives face information concerning an apparatus of which information is transmitted by proxy, an owner of the apparatus of which information is transmitted by proxy needs to be present within an imaging range to identify an individual using the face information from the captured image. However, it is difficult to take a photograph including respective owners of the apparatuses which are moving such that the mutual relative positions are separated away from each other as described above, and there is a high possibility that either one the owners will be present beyond the imaging range. In other words, it is unnecessary to perform proxy transmission of face information between the apparatuses in positional relationship beyond the imaging range of the camera, because a person cannot be identified from an image which the camera has captured using the face information transmitted by proxy.

On the other hand, if mobile terminal apparatuses transmit information concerning their own apparatuses respectively, the wireless communication bands to be used will increase, and the wireless communication bands to be used for other communications will become tight. Therefore, it is desired to perform control to collectively transmit by proxy information concerning other apparatuses which are deemed necessary to be transmitted by proxy, and not to transmit by proxy information which is not necessary to be transmitted by proxy or will be no longer necessary to be transmitted by proxy if it is received information.

SUMMARY OF THE INVENTION

According to an aspect of the present invention, a communication apparatus includes a detection unit configured to detect received powers of a plurality of radio signals received during a first predetermined time period from another apparatus, and a transmission unit configured to transmit by proxy identification information of the another apparatus using a detection result by the detection unit as at least one condition.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates received power values and received power change amounts of respective terminal apparatuses.

FIG. 6 illustrates other examples of communication frames.

FIG. 7 illustrates received power values, received power change amounts, and types of public information of respective terminal apparatuses.

DESCRIPTION OF THE EMBODIMENTS

Various exemplary embodiments, features, and aspects of the invention will be described in detail below with reference to the drawings.

A communication apparatus according to an exemplary embodiment which will be described below, in a case where any of a plurality of apparatuses transmits by proxy information concerning other communication apparatus, does not transmit by proxy unnecessary information.

Figure 1:
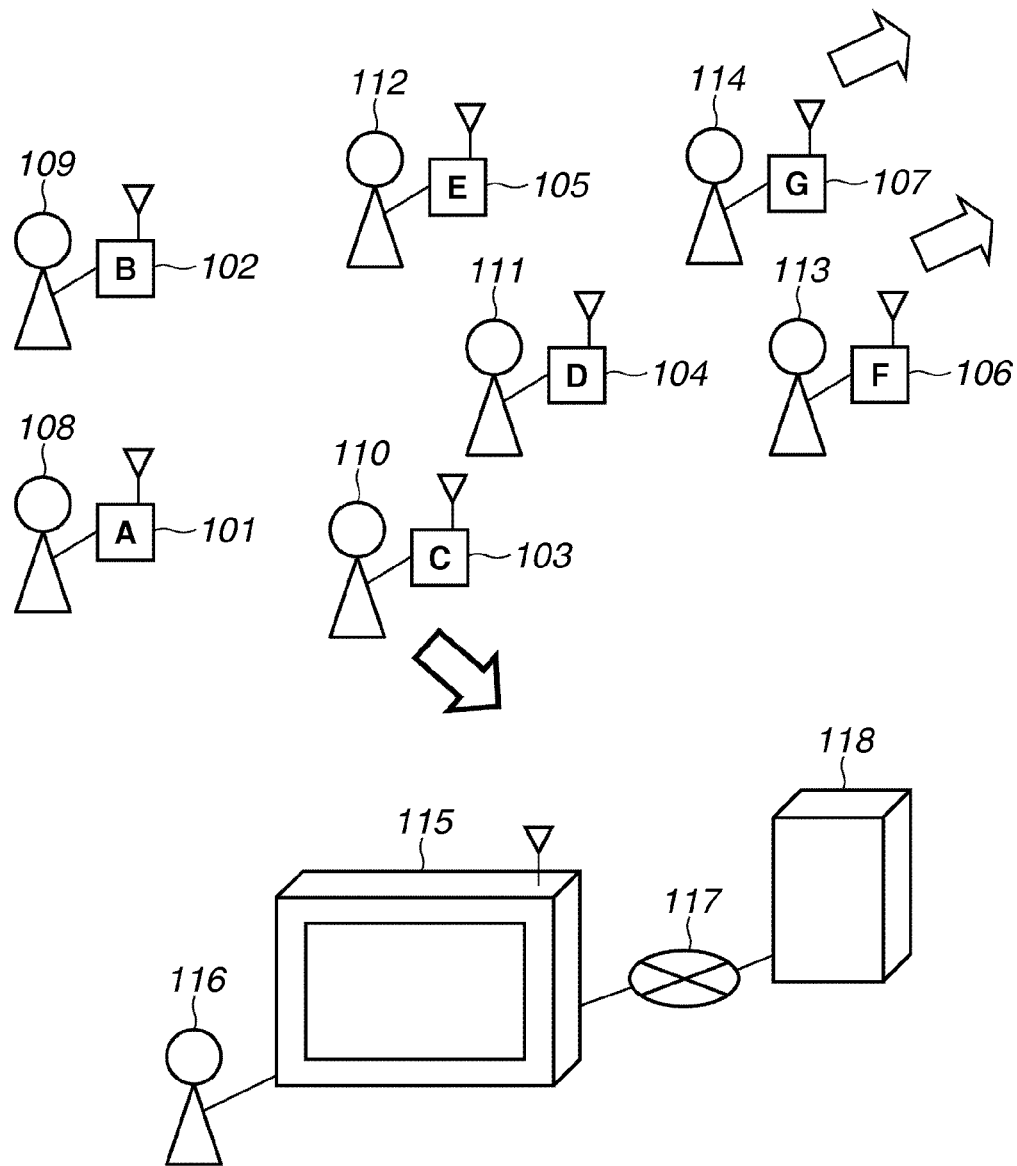
FIG. 1 illustrates an example of a system configuration.

A communication system according to a first exemplary embodiment will be described below referring to the drawings. FIG. 1 illustrates a configuration of the communication system. Communication apparatuses (hereinbelow, terminal apparatuses) 101 to 107 each have wireless communication functions, and owners 108 to 114 own the respective terminal apparatuses. According to the present exemplary embodiment, among the terminal apparatuses 101 to 107, a terminal apparatus which operates as a representative terminal apparatus described below transmits identification information of its own terminal apparatus and/or another terminal apparatus per predetermined cycle (e.g., 100 milliseconds).

The identification information is an identifier for uniquely identifying a terminal apparatus and is information set for each terminal apparatus, such as media access control (MAC) address. Further, the identification information may be an identifier for uniquely determining an owner of the terminal apparatus, and may be, for example, a user identification (ID). According to the present exemplary embodiment, the owner of each terminal apparatus is assumed to be present outdoor, and a case will be described as an example in which the owners 110, 113, and 114 move in directions indicated by arrows respectively, and other owners stand still.

An imaging apparatus 115 has the wireless communication function, and an owner 116 owns the imaging apparatus 115. The imaging apparatus 115 obtains public information which is received from the other terminal apparatus from a server 118 and associated with identification information of the terminal apparatus, and displays on a display unit the obtained public information and a captured image by combining with each other.

Further, the imaging apparatus 115 associates the obtained public information with an object on the captured image and displays them by combining with each other on the display unit.

The server 118, upon receiving an inquiry including identification information of a terminal apparatus from the imaging apparatus 115, searches database for public information associated with the received identification information, and transmits the public information to the imaging apparatus 115. Further, the server 118 obtains feature information, from the database, used by the imaging apparatus in order to detect and identify an object associated with the received identification information from the captured image, and transmits the feature information to the imaging apparatus 115.

A network 117 is used for communications between the imaging apparatus 115 and the server 118. As a communication method of the network 117, any arbitrary method may used regardless of wired or wireless. According to the present exemplary embodiment, the communication system is configured to obtain feature information and public information from the server 118 based on identification information of a terminal apparatus. However, a configuration may also be employed in which a terminal apparatus notifies feature information and public information. Alternatively, identification information itself may be feature information or public information.

An example will be described in which a wireless local area network (LAN) communication method compliant with IEEE 802.11 series is used for wireless communication performed between the terminal apparatuses 101 to 107 and the imaging apparatus 115. However, a communication form is not limited to the wireless LAN communication method compliant with IEEE 802.11, and arbitrary wireless communication standard can be used.

Figure 8:
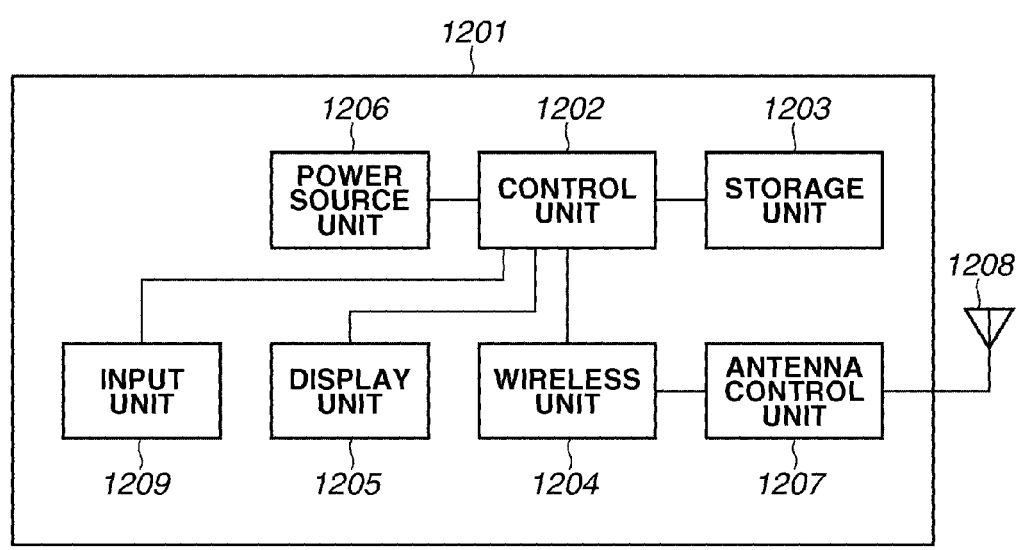
FIG. 8 is a block diagram illustrating a hardware configuration of the terminal apparatus.

An example of hardware configuration of the terminal apparatuses 101 to 107 according to the present exemplary embodiment will be described with reference to FIG. 8. A control unit 1202 controls the entire apparatus 1201 by executing a control program stored in a storage unit 1203. The storage unit 1203 stores the control program executed by the control unit 1202, and various information pieces. Various operations described below are performed by the control unit 1202 executing the control program stored in the storage unit 1203.

A wireless unit 1204 is used for performing wireless LAN communication compliant with IEEE 802.11 series. A display unit 1205 performs various displays and has a function of enabling output of visually recognizable information like a liquid crystal display (LCD) or a light-emitting diode (LED), or sound output such as a speaker. A power source unit 1206 supplies power to each hardware. The terminal apparatus also includes an antenna control unit 1207, and an antenna 1208. An input unit 1209 is a unit to be used by a user to perform various inputs.

Figure 2:
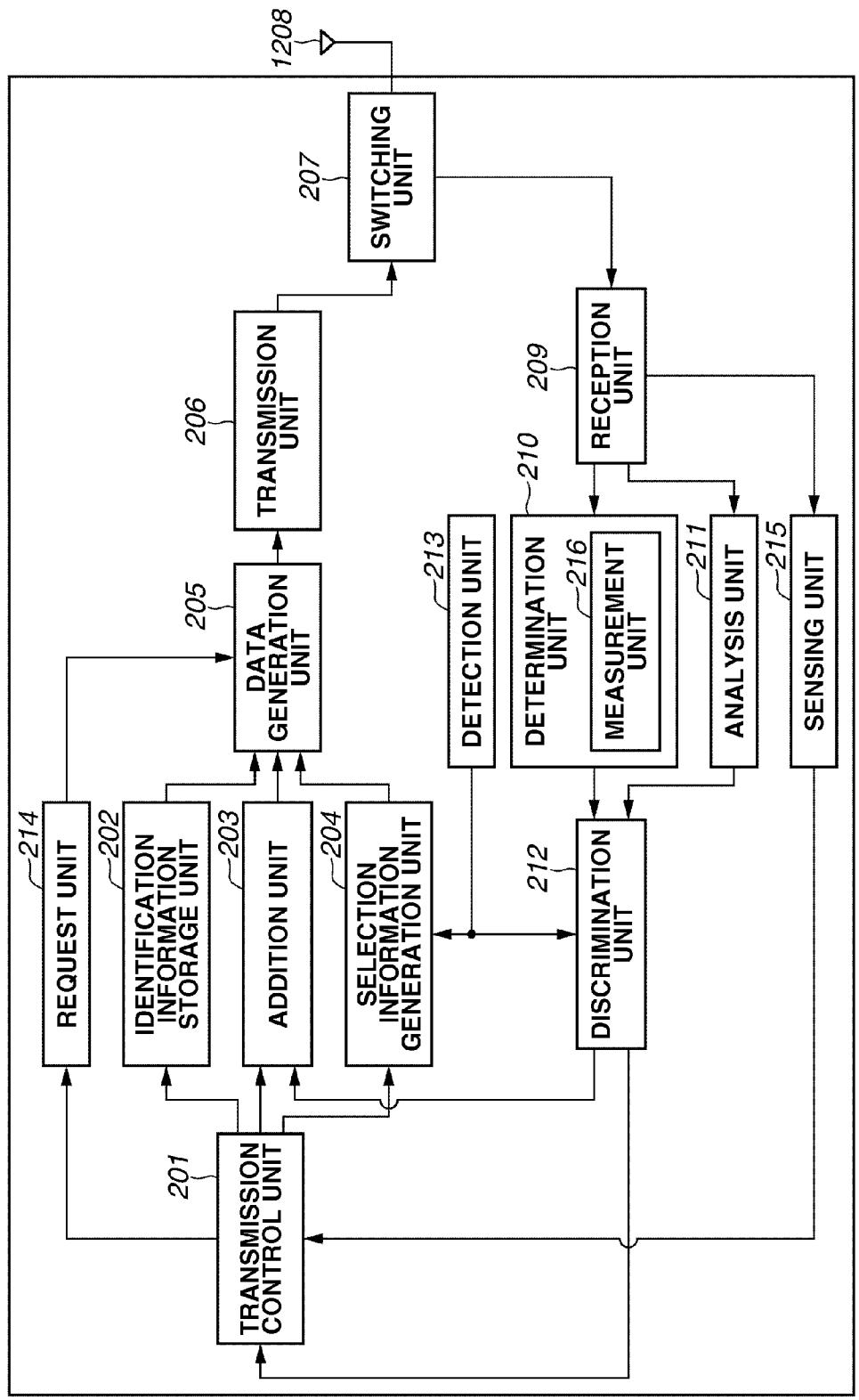
FIG. 2 is a block diagram illustrating a functional configuration of a terminal apparatus.

FIG. 2 is a block diagram illustrating a functional configuration realized by the control unit 1202 of the terminal apparatuses 101 to 107 calculating and processing information and controlling each hardware. A part or all of units in the functional configuration illustrated in FIG. 2 may be realized as hardware. A transmission control unit 201 controls operations involved in transmission processing of the terminal apparatus. For example, the transmission control unit 201 controls a data generation unit and a transmission unit described below to transmit an annunciation signal including identification information at predetermined time intervals.

An identification information storage unit 202 stores therein identification information for uniquely identifying own terminal apparatus. The identification information storage unit 202 outputs the identification information of the own terminal apparatus to a data generation unit 205 based on the control of the transmission control unit 201.

An addition unit 203 stores therein identification information of another terminal apparatus to be transmitted in a case of operating as a representative terminal apparatus. The addition unit 203 outputs the identification information of the other terminal apparatus to the data generation unit 205 based on the control of the transmission control unit 201.

A selection information generation unit 204 generates representative selection information used for determination of a representative terminal apparatus based on the control of the transmission control unit 201, and outputs the representative selection information to the data generation unit 205. The representative terminal apparatus refers to an apparatus that transmits by proxy identification information of the other terminal apparatus. Further, the representative selection information is information for determining the representative terminal apparatus, and is information indicating a state of the apparatus. For example, representative selection information is power remaining amount information of the own terminal apparatus which a detection unit 213 outputs or information indicating whether the own terminal apparatus forms an infrastructure network.

The data generation unit 205 adds a header or the like to input data, and generates transmission data based on corresponding wireless communication standard. According to the present exemplary embodiment, the data generation unit 205 generates a communication frame in accordance with IEEE 802.11 series standards.

A transmission unit 206 includes a modulation circuit, a frequency conversion circuit, a power amplification circuit, and the like. The transmission unit 206 performs modulation processing, frequency conversion processing, or the like on a communication frame output by the data generation unit 205 to generate a wireless communication signal and outputs the generated signal to a switching unit 207. The switching unit 207 includes switching circuits. The switching unit 207 connects the transmission unit 206 and the antenna 1208 when the transmission operation is performed, and connects the reception unit 209 and the antenna 1208 when the transmission operation is not performed.

The reception unit 209 includes a demodulation circuit, a frequency conversion circuit, a variable gain amplification circuit, and the like. The reception unit 209 decodes a received signal by performing demodulation processing, frequency conversion processing, or the like on the received wireless communication signal.

A determination unit 210 determines whether a plurality of radio signals has been received continuously for a predetermined period of time for each transmission source. Further, the determination unit 210 measures received powers of the plurality of radio signals received during the predetermined period of time, and determines whether a change amount over time of reception intensity (received power change amount) exceeds a predetermined value. The received power change amount is a value indicating a temporal change of the received power, and is calculated by the determination unit 210. The determination unit 210 determines whether the own terminal apparatus and another terminal apparatus which is a transmission source of a radio signal are present within a certain distance of the own terminal apparatus for a predetermined period of time based on the calculated received power change amount. Further, the determination unit 210 determines how the other terminal apparatus is moving in reference to the own terminal apparatus based on the calculated received power change amount.

The determination unit 210 stores the identification information pieces, the received powers, and the received power change amounts received from surrounding terminal apparatuses by associating them with one another. Then, the determination unit 210 determines whether to transmit by proxy the identification information of the other terminal apparatus based on the received power values of a plurality of radio signals received during a predetermined period of time from the other terminal apparatus. Alternatively, the determination unit 210 determines whether to cause the other terminal apparatus to transmit by proxy the identification information of the own terminal apparatus based on the received power values of the plurality of radio signals received during the predetermined period of time from the other terminal apparatus. The determination unit 210 includes a measurement unit 216 for measuring a received power of a radio signal and measuring a change amount of the received power.

An analysis unit 211 analyzes information included in a communication frame received from the other terminal apparatus. The analysis unit 211 detects and analyzes, for example, representative selection information indicating a state of the other terminal apparatus from the communication frame. The analysis unit 211 detects information of a power remaining amount of the other terminal apparatus included in the received communication frame, and notifies a discrimination unit 212 of the information. Alternatively, the analysis unit 211 analyzes whether the other terminal apparatus forms a network based on the information included in the received communication frame, and notifies the discrimination unit 212 of the network.

The discrimination unit 212, upon receiving a determination result from the determination unit 210, determines whether to transmit by proxy the identification information pieces of the own terminal apparatus and the other terminal apparatus based on a state of the own terminal apparatus and/or a state of the other terminal apparatus notified from the analysis unit 211. In other words, the discrimination unit 212 discriminates which of the own terminal apparatus or the other terminal apparatus will be the representative terminal apparatus. Further, the discrimination unit 212, upon receiving the determination result from the determination unit 210, determined whether to request the other terminal apparatus for proxy transmission of the identification information of the own terminal apparatus based on the state of the own terminal apparatus and/or the state of the other terminal apparatus notified from the analysis unit 211.

The discrimination unit 212 compares power remaining amount information received from the other terminal apparatus and power remaining amount information of the own terminal apparatus, and discriminates which apparatuses will be the representative terminal apparatus based on the power remaining amount. Further, if in a state where an annunciation signal needs to be cyclically transmitted to maintain a network which the own terminal apparatus has formed, the discrimination unit 212 determines that the own terminal apparatus will be the representative terminal apparatus. The network in which the annunciation signals needs to be cyclically transmitted is, for example, an infrastructure network formed by a base station in IEEE 802.11 standard. Further, if in a state where an annunciation signal needs to be cyclically transmitted to maintain a network which the other terminal apparatus has formed, the discrimination unit 212 determines that the other terminal apparatus will be the representative terminal apparatus.

Furthermore, the discrimination unit 212 discriminates which apparatuses will be the representative terminal apparatus based on whether the own terminal apparatus is already in operation as the representative terminal apparatus or the other terminal apparatus is already in operation as the representative terminal apparatus.

A request unit 214, in a case where the other terminal apparatus is selected as the representative terminal apparatus, requests the other terminal apparatus to transmit the identification information of the own terminal apparatus by control from the transmission control unit 201.

A sensing unit 215 detects a message for permitting the request or the identification information of the own terminal apparatus is transmitted from the other terminal apparatus which is requested by the request unit 214 to transmit the identification information of the own terminal apparatus. The sensing unit 215, upon detecting the message for permitting the request or the identification information of the own terminal apparatus is transmitted from the other terminal apparatus, informs the transmission control unit 201 to stop notification of the identification information of the own terminal apparatus.

Figure 3:
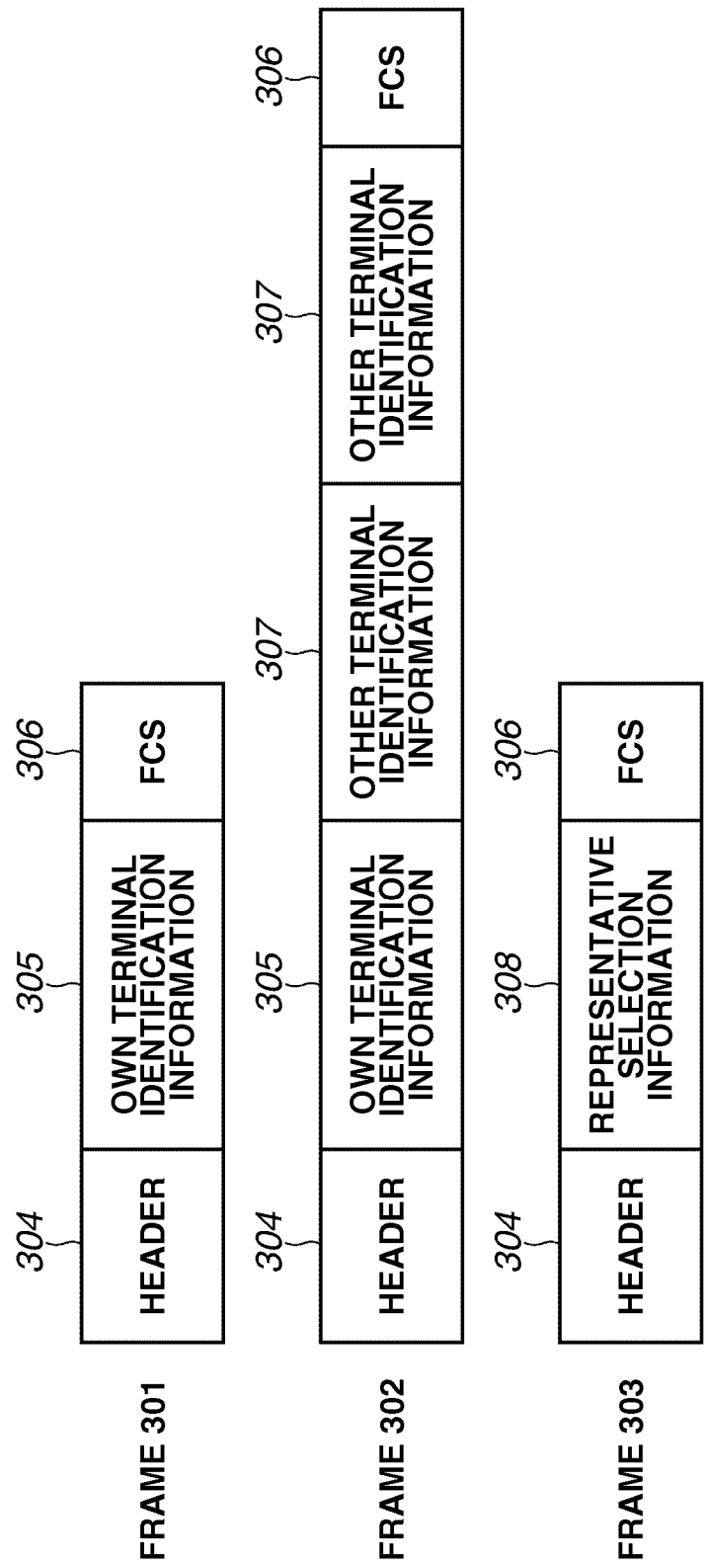
FIG. 3 illustrates examples of communication frames.

In FIG. 3, examples of communication frames 301 to 303 generated by the data generation unit 205 according to the present exemplary embodiment are illustrated. The frame 301 is a frame generated before determination of the representative terminal apparatus. The frame 301 includes a header 304, own terminal apparatus identification information 305, and a frame check sequence (FCS) 306. The header 304 includes a physical layer convergence protocol (PLCP) preamble, a PLCP header, a media access control (MAC) header, and the like. The own terminal apparatus identification information 305 is identification information of the own terminal apparatus, and is stored in a frame body field. The FCS 306 includes a MAC header and an error detection symbol for detecting an error of the frame body field.

The frame 302 is a frame generated by a terminal apparatus which has become the representative terminal apparatus after determination of the representative terminal apparatus. In a frame body field of the frame 302, other terminal apparatus identification information 307 is stored in addition to the own terminal apparatus identification information 305. FIG. 3 illustrates an example where the frame 302 includes two pieces of the other terminal apparatus identification information 307. However, the frame 303 for storing therein identification information pieces by the number of the other terminal apparatuses which the representative terminal apparatus will transmit thereto is a frame generated by each of the terminal apparatuses, when the representative terminal apparatus is determined. In a frame body field of the frame 303, representative selection information 308 is stored. It is assumed that a beacon frame of IEEE 802.11 standard is used to the frames 301 to 303. In that case, it is only necessary to arrange the own terminal apparatus identification information 305, the other terminal apparatus identification information 307, and the representative selection information 308 in vendor specific information elements in the beacon frame.

An example of information in which identification information, received powers, and received power change amounts are associated with each other and which is received from surrounding terminal apparatuses and stored by the determination unit 210 is illustrated in FIG. 4. FIG. 4 is an example of information stored in the determination unit 210 of the terminal apparatus A101 before determination of the representative terminal apparatus. Before determination of the representative terminal apparatus, each terminal apparatus transmits identification information at each predetermined cycle, and the terminal apparatus A101 stores the received identification information and an average value of received powers when the identification information pieces are received by associating with each other. In addition, the terminal apparatus A101 stores the received powers measured a plurality of times each time when the identification information is received, and calculates and stores temporal change amounts thereof.

According to the present exemplary embodiment, since the terminal apparatus A101, the terminal apparatus B102, the terminal apparatus D104, and the terminal apparatus E105 are remained still, in the terminal apparatus A101, received power change amounts of the terminal apparatus B102, the terminal apparatus D104, and the terminal apparatus E105 are calculated and stored as 0 dBm/sec. Further, since both the terminal apparatus F106 and the terminal apparatus G107 move away from the terminal apparatus A101 in the same direction, in the terminal apparatus A101, received power change amounts from both the terminal apparatuses are calculated and stored as −4 dBm/sec (received powers decrease by 4 dBm/sec). Further, since the terminal apparatus C103 moves away from the terminal apparatus A101 but currently is present relatively near the terminal apparatus A101, received power change amounts are calculated and stored as −2 dBm/sec.

A threshold value of radio signals from the other terminal apparatus as a target of the proxy transmission by the determination unit 210 is set, for example, to −50 dBm or over for the received power, and to 1 dBm/sec or under for an absolute value of the received power change amount. The threshold value can be determined arbitrarily, based on an imaging range of the imaging apparatus 115 or a resolution (accuracy of object identification processing) of an object identifiable from an image captured by the imaging apparatus 115. The threshold value is set in order to, if the imaging apparatus 115 captures an image of the representative terminal apparatus (the owner of the terminal apparatus) that transmits by proxy identification information of the other terminal apparatus, prevent a case that the other terminal apparatus is situated far away from the representative terminal apparatus that the other terminal apparatus is out of the imaging range. In other words, this is because it is not necessary to transmit by proxy the identification information of the other terminal apparatus which seems to be situated out of the imaging range when an image of the owner of the representative terminal apparatus is captured. Further, it is not necessary to transmit by proxy the identification information of the other terminal apparatus, in a case where, even if an image of the owner of the other terminal apparatus of which identification information is transmitted by proxy can be captured, the owner shows up small enough to fall below a resolution that can identify the owner. Thus, the threshold value is set to avoid such cases.

Regarding another terminal apparatus to which the own terminal apparatus moves closer (in a manner that a received power increases), the other terminal apparatus is not regarded as a target of proxy transmission if a received power change amount exceeds 1 dBm/sec. This is because there is a possibility that the other terminal apparatus currently moving closer to the own terminal apparatus will move away from the own terminal apparatus at some time. In addition, another terminal apparatus of which received power change amount is not monotonous increased or decreased, and received power increases and decreases in a predetermined period of time is not regarded as a target of proxy transmission. This is because there is a possibility that such other terminal apparatus of which movement is unstable will also move away from the own terminal apparatus at some time.

In the case of descriptions in FIG. 4, the determination unit 210 in the terminal apparatus A101 determines only the terminal apparatus B102 as an identification information proxy transmission target. The proxy transmission target refers to a candidate other terminal apparatus that transmits identification information of the own terminal apparatus by proxy, or a candidate other terminal apparatus of which identification information is transmitted by proxy by the own terminal apparatus. In addition, the determination unit 210 in the terminal apparatus A101 determines not to handle the terminal apparatuses D104 and E105 as the proxy transmission targets, since they are far away (since the received powers are low), although the received power change amounts are 0 dBm/sec and there is no change in relative positional relationships with the terminal apparatus A101. Further, it is determined that the terminal apparatus C103 is near the terminal apparatus A101 (the received power is high), but the determination unit 210 in the terminal apparatus A101 determines that the terminal apparatus C103 is moving away from the terminal apparatus A101 since the received power change amount is −2 dBm/sec. Further, since the terminal apparatuses F106 and G107 are currently far away from and seem to be moving away from the apparatus A101, the determination unit 210 in the terminal apparatus A101 determines not to handle the terminal apparatuses F106 and G107 as the proxy transmission targets.

As described above, even if another terminal apparatus is currently present near the own terminal apparatus, the present exemplary embodiment can realize control not to transmit by proxy the identification information of the other terminal apparatus that seems to move away from the own terminal apparatus by receiving the electric power of radio signals from the other terminal apparatus for a predetermined period of time, and measuring temporal changes of the received powers. Further, the present exemplary embodiment can perform control not to allow the other terminal apparatus that seems to relatively move away from the own terminal apparatus to transmit by proxy the identification information of the own terminal apparatus. In other words, even if the terminal apparatuses are in the communicable range, the positional relationship therebetween is taken into consideration, and proxy transmission of the identification information between the apparatuses is not performed if it is determined that transmission by proxy is not necessary.

Figure 5B:
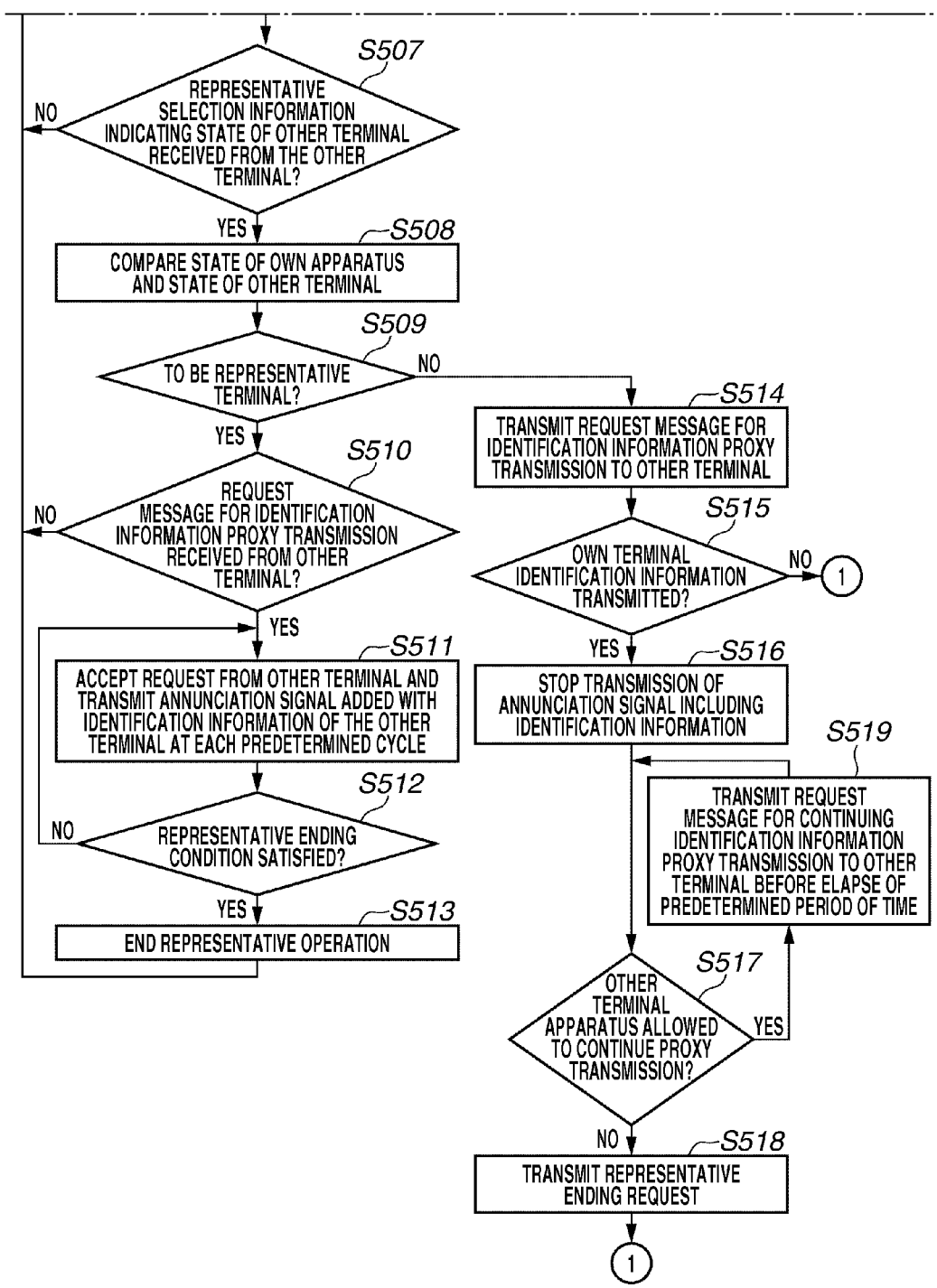
FIG. 5 (including FIGS. 5A and 5B) is a flowchart illustrating operations of the terminal apparatus.

Operations of the terminal apparatuses 101 to 107 in the communication system according to the present exemplary embodiment having the above-described configuration will be described with reference to a flowchart illustrated in FIG. 5. The flowchart illustrated in FIG. 5 (including FIGS. 5A and 5B) is realized by executing a control program read from the storage unit 1203 by the control unit 1202. In step S501, the terminal apparatus repeats subsequent operations after receiving an operation start instruction from the owner and until receiving an operation stop instruction.

In step S502, the transmission control unit 201 controls the data generation unit 205 to generate and transmit a communication frame including identification information of the own terminal apparatus at each predetermined cycle (e.g., 100 milliseconds). In step S503, the reception unit 209 determines whether radio signals including identification information of the other terminal apparatus are received.

In step S504, the determination unit 210 measures, a plurality of times, received powers of the radio signals received from the other terminal apparatus in a predetermined period of time (e.g., 10 seconds) after firstly receiving the identification information of the other terminal apparatus, and measures temporal change amounts of the received powers.

In step S505, the determination unit 210 receives a plurality of radio signals transmitted from the other terminal apparatus cyclically for a predetermined period of time, and determines whether temporal change amounts of the received powers fall below a predetermined value. The determination unit 210, for example, in a case where the radio signals become unable to be cyclically received from the other terminal apparatus before the predetermined period of time has elapsed after receiving the radio signals from the other terminal apparatus, determines not to handle the other terminal apparatus as the proxy transmission target (NO in step S505), and the processing returns to step S501.

Further, in a case where the radio signals transmitted from the other terminal apparatus are received for the predetermined period of time but the temporal change amounts of the received powers exceed a predetermined value (1 dBm/sec in the above-described example), the determination unit 210 determines not to handle the other terminal apparatus as the proxy transmission target (NO in step S505), and the processing returns to step S501. In other words, in a case where the other terminal apparatus seems to move away from the own terminal apparatus, the determination unit 210 determines not to handle the other terminal apparatus as the proxy transmission target.

Furthermore, in a case where the radio signals are continuously received from the other terminal apparatus for the predetermined period of time but an average value of the received powers of the respective radio signals measured for the plurality of times fall below a certain value (−50 dBm in the above-described example), the determination unit 210 determines not to handle the other terminal apparatus as the identification information proxy transmission target (NO in step S505), and the processing returns to step S501. In other words, the determination unit 210 determines that the other terminal apparatus that seems to be away at a certain distance or over from the own terminal apparatus is not handled as the proxy transmission target. Then, the determination unit 210 determines that the other terminal apparatus is not handled as the identification information proxy transmission target (NO in step S505), and the processing returns to step S501.

On the other hand, if the determination unit 210 determines that the radio signals transmitted from the other terminal apparatus are received for the predetermined period of time at a certain received power value or over and the temporal change amounts of the received powers fall below a predetermined value (YES in step S505), the processing proceeds to step S506.

In step S506, the transmission control unit 201 controls the transmission unit 206 to transmit a communication frame added with representative selection information generated by the selection information generation unit 204 to the other terminal apparatus that is the proxy transmission target. The representative selection information generated by the selection information generation unit 204 is power remaining amount information of the own terminal apparatus detected by the detection unit 213. The representative selection information may be information indicating a state where the own terminal apparatus needs to form a network with other communication apparatus and cyclically transmit beacons. Further, the representative selection information may be numerical value information indicating a degree of intention to be the representative terminal apparatus. Furthermore, the representative selection information may be information for notifying the other terminal apparatus that the own terminal apparatus will be the representative terminal apparatus. Alternatively, the representative selection information may be information for notifying that the own terminal apparatus has already operated as the representative terminal apparatus.

In step S507, the reception unit 209 determines whether representative selection information indicating a state of another terminal apparatus is received from the other terminal apparatus. In step S507, if the reception unit 209 is not received the representative selection information from the other terminal apparatus for a predetermined period of time (e.g., 100 milliseconds) (NO in step S507), the processing returns to step S501 on the consideration that ambient environment is not stable.

If the reception unit 209 is received the representative selection information from the other terminal apparatus (YES in step S507), the processing proceeds to step S508. In step S508, the analysis unit 211 detects and analyzes the representative selection information indicating the state of the other terminal apparatus included in the communication frame received from the other terminal apparatus. For example, the analysis unit 211 detects power remaining amount information of the other terminal apparatus included in the received communication frame, and notifies the discrimination unit 212 of the power remaining amount information. Alternatively, the analysis unit 211 analyzes whether the other terminal apparatus forms a network based on the information included in the received communication frame, and notifies the discrimination unit 212 of the network. Alternatively, the analysis unit 211 detects numerical value information indicating a degree of intention to be the representative terminal apparatus based on the information included in the received communication frame, and notifies the discrimination unit 212 of the detected information. Alternatively, the analysis unit 211 detects information for notifying that the other terminal apparatus becomes the representative terminal apparatus or has operated as the representative terminal based on the information included in the received communication frame, and notifies the discrimination unit 212 of the information.

In step S508, the discrimination unit 212 discriminate which of the own terminal apparatus and the other terminal apparatus to be the representative terminal apparatus based on the state of the own terminal apparatus and/or the state of the other terminal apparatus notified from the analysis unit 211. For example, the discrimination unit 212 compares the power remaining amount information received from the other terminal apparatus and the power remaining amount information of the own terminal apparatus, and determines that the apparatus with more remaining amount of power becomes the representative terminal apparatus. Since the apparatus with more remaining amount of battery performs proxy transmission, a communicable length of time of the apparatus with less remaining amount of battery can be elongated.

In addition, if in a state where the own terminal apparatus forms the network and needs to notify a beacon (an annunciation signal) for maintaining the network, the discrimination unit 212 determines that the own terminal apparatus becomes the representative terminal apparatus. Further, if in a state where the other terminal apparatus forms the network and needs to notify a beacon for maintaining the network, the discrimination unit 212 determines that the other terminal apparatus becomes the representative terminal apparatus. An apparatus that needs to cyclically notify an annunciation signal transmits by proxy the identification information of the other terminal apparatus together, so that the communication bands can be effectively utilized.

Further, in a case where the own terminal apparatus has already operated as the representative terminal apparatus or the other terminal apparatus has already operated as the representative terminal apparatus, the discrimination unit 212 determines that the apparatus that has already operated as the representative terminal apparatus will become the representative terminal apparatus. Since the terminal apparatus that has already operated as the representative terminal apparatus further transmits identification information of the other terminal apparatus, an amount of throughput for determining the representative terminal apparatus can be reduced and it is efficient. Further, the discrimination unit 212 compares numerical value information pieces indicating a degree of intention to be the representative terminal apparatus from the own terminal apparatus and the other terminal apparatus, and discriminates that the apparatus with larger numerical value will become the representative terminal apparatus. The discrimination unit 212 also determines a terminal apparatus to become the representative terminal apparatus based on comparison of the MAC addresses.

In step S509, the terminal apparatuses 101 to 107 perform determination of whether the own terminal apparatus becomes the representative terminal apparatus. If the own terminal apparatus becomes the representative terminal apparatus (YES in step S509), the processing proceeds to step S510. If the own terminal apparatus does not become the representative terminal apparatus (NO in step S509), the processing proceeds step S514.

In step S510, if the own terminal apparatus is discriminated to become the representative terminal apparatus, the reception unit 209 determines whether a message for requesting to transmit by proxy the identification information of the other terminal apparatus is received from the other terminal apparatus. If the reception unit 209 does not receive the request message for a predetermined period of time (e.g., 5 seconds) (NO in step S510), the processing returns to step S501. Whereas, if the reception unit 209 receives the request message (YES in step S510), the processing proceeds to step S511.

In step S511, the transmission control unit 201 controls the data generation unit 205 to generate a response message for notifying the other terminal apparatus that has transmitted the request message of permission of request, and controls the transmission unit 206 to transmit the response message. Then, the transmission control unit 201 transmits the frame 302 including the identification information of the own terminal apparatus and the identification information of the other terminal apparatus at each predetermined cycle (e.g., 100 milliseconds). Request messages transmitted from different other terminal apparatuses that have not performed the processing in step S503 to step S508 are rejected.

In step S512, if a condition for ending the operation as the representative terminal apparatus is satisfied (YES in step S512), the processing proceeds to step S513. Otherwise (NO in step S512), the processing returns to step S511, and the operation as the representative terminal apparatus is continued.

The condition for ending the operation as the representative terminal apparatus is a case where duration of the operation as the representative terminal apparatus exceeds a predetermined time (e.g., 100 seconds), or a case of a representative operation ending request message for requesting to stop proxy transmission of the identification information is received from the other terminal apparatus. Further, if it is detected that the other terminal apparatus notifies the identification information that is transmitted by proxy, the operation as the representative terminal apparatus is ended.

Further, if a message for requesting to continue proxy transmission is received from the other terminal apparatus that the representative terminal apparatus receives transmits by proxy the identification information thereof before a time, for example, 100 seconds exceeding after starting the proxy transmission, the representative terminal apparatus further continues proxy transmission of the identification information of the other terminal apparatus for a predetermined time (e.g., 100 seconds). If a representative ending condition is satisfied (YES in step S512), then in step S513, the terminal apparatus that has become the representative terminal apparatus ends the operation as the representative terminal apparatus, and the processing returns to step S501.

On the other hand, in step S509, if it is determined that the other terminal apparatus will become the representative terminal apparatus (NO in step S509), in step S514, the request unit 214 transmits a message for requesting to transmit by proxy identification information to the other terminal apparatus which is determined to become the representative terminal apparatus.

In step S515, the sensing unit 215 determines whether the own terminal identification information is transmitted by proxy to the other terminal apparatus based on a signal received by the reception unit 209. For example, the sensing unit 215 detects whether the own terminal identification information is transmitted by proxy to the other terminal apparatus according to a response from the other terminal apparatus for the request made by the request unit 214.

If a response to permit proxy transmission of the own terminal identification information is returned from the other terminal apparatus (YES in step S515), the processing proceeds to step S516. On the other hand, if a response to reject proxy transmission of the own terminal identification information is returned from the other terminal apparatus (NO in step S515), the processing returns to step S501. In addition, the sensing unit 215 detects whether the other terminal apparatus transmits the own terminal identification information. If the other terminal apparatus transmits the own terminal identification information, the processing proceeds to step S516. Further, a response to the request for proxy transmission of the identification information or the fact that that the other terminal apparatus transmits the own terminal identification information cannot be detected during a predetermined period of time (e.g., 1 second) (NO in step S515), the processing returns to step S501.

In step S516, the transmission control unit 201 performs control to stop cyclical transmission of the identification information of the own terminal apparatus.

Then, in step S517, the terminal apparatus determines whether to allow the other terminal apparatus to continue proxy transmission. If the other terminal apparatus is allowed to continue proxy transmission (YES in step S517), the processing proceeds to step S519. Otherwise (NO in step S517), the processing proceeds to step S518. Determination of whether to allow the other terminal apparatus to continue proxy transmission is performed as follows. For example, in a case where received powers of radio signals transmitted by the representative terminal apparatus fall below a predetermined value, or in a case where received power change amounts exceed a predetermined value, it is determined that proxy transmission is not continued. Alternatively, if an ending message for stopping proxy transmission of the identification information is received from the other terminal apparatus, it is determined that proxy transmission is not continued. Further, when it is detected that the own terminal identification information is no longer included in an annunciation signal from the other terminal apparatus, the processing also proceeds to step S518.

In step S518, the transmission control unit 201 transmits a representative operation ending request to the representative terminal apparatus, and the processing returns to step S501.

On the other hand, in step S519, the transmission control unit 201 performs control to transmit a request message for continuing identification information proxy transmission to the other terminal apparatus (i.e., the representative terminal apparatus) that transmits by proxy the own terminal identification information before, for example, 100 seconds has elapsed after starting proxy transmission. Then, the processing returns to step S517.

By the above-described processing, in the drawing in FIG. 4 for example, according to the present exemplary embodiment, the terminal apparatus A101, the terminal apparatus C103, and the terminal apparatus F106 with larger power remaining amounts transmit the frames 302 as the representative terminal apparatus, and the other terminal apparatuses will stop transmission of the identification information.

According to the present exemplary embodiment, based on received powers of a plurality of radio signals received during a first predetermined period of time from other terminal apparatuses, it is determined whether identification information of the other terminal apparatus is to be transmitted by proxy, and the identification information of the other terminal apparatus can be transmitted by proxy according to the determination that identification information of the other terminal apparatus is transmitted by proxy. Since the identification information of the other terminal apparatus is transmitted by proxy in a case where change amounts of the received powers of the plurality of radio signals received during the first predetermined period of time fall below a first predetermined value, it can be determined whether the identification information of the other terminal apparatus is transmitted by proxy in consideration of movement of the other terminal apparatus. In addition, since the identification information of the other terminal apparatus is transmitted by proxy in a case where an average value of the received powers of the plurality of radio signals received during the first predetermined period of time exceeds a second predetermined value, a distance from the other terminal apparatus can be taken into consideration. Further, since proxy transmission is stopped in a case where a second predetermined period of time has elapsed after starting proxy transmission of the identification information of the other terminal apparatus, unnecessary proxy transmission can be avoided being endlessly continued.

In other words, according to the above-described operation of the terminal apparatus, any one in a terminal apparatus group which has less change of a relative positional relationship with the own terminal apparatus and seems to be situated within a range of a certain distance transmits by proxy identification information of the other terminal apparatus together, based on received powers of radio signals received during a predetermined period of time. Then, the terminal apparatus of which identification information is transmitted by proxy stops transmission of the identification information. Accordingly, the header 304 and the FCS 306 that have been transmitted from each terminal apparatus before determination of the representative terminal apparatus are reduced, and an effective use of communication resources (an effective use of communication bands) and enhancement of system power efficiency can be achieved.

Further, since the other terminal apparatus that transmits by proxy is determined based on received power values, an inquiry based on identification information of a terminal apparatus which seems not to be present within an imaging range (an object cannot be identified) is not made in the imaging apparatus 115. Thus, efficiency of the entire system will not be impaired. Since it is determined that, even if identification information can be received (communicable between apparatuses), proxy transmission of information is not necessary between the apparatuses which are far away from each other or move in a manner that relative positional relationship is separated from each other, an useless proxy transmission that increases a processing load of the system is not performed.

In other words, according to the present exemplary embodiment, a communication terminal apparatus suitable for the AR system in which a wireless communication terminal apparatus transmits identification information at each predetermined cycle can be provided. Further, the present embodiment is not limited to the AR system. The present embodiment can be also applied to a system in which a plurality of wireless communication terminal apparatuses transmits specific data which is not temporally changed or temporally changed less frequently.

According to the present exemplary embodiment, it is configured such that each terminal apparatus notifies one another of a state of its own terminal apparatus, such as power remaining amount information (by negotiations based on communications between the apparatuses), so that a representative terminal apparatus is selected. However, the present exemplary embodiment is not limited to this configuration. For example, in a case where another terminal apparatus that has become a proxy transmission target is detected, back-off time of IEEE 802.11 standard can be determined based on a state of the own terminal apparatus. More specifically, for example, the less power remaining amount the terminal apparatus has, the larger the contention window is set up, and the longer back-off time when data transmission is started is taken. Then, a terminal apparatus that obtains a transmission right first among other terminal apparatuses by back-off control is determined as the representative terminal apparatus. Further, it may be configured such that the terminal apparatus that obtains a transmission right first is taken as the representative terminal apparatus simply based on back-off control of IEEE 802.11 standard. Accordingly, since communication between the apparatuses for determining the representative terminal apparatus can be reduced, band efficiency and system power efficiency can be further improved.

Further, it may be configured to spontaneously transmit by proxy identification information of a partner apparatus that has become a proxy transmission target by the determination unit 210 without executing discrimination processing by the discrimination unit 212. Further, it may be configured to allow a partner apparatus that has become a proxy transmission target by the determination unit 210 to transmit by proxy identification information of the own terminal apparatus without executing discrimination processing by the discrimination unit 212.

Further, according to the present exemplary embodiment, it is configured to measure a distance from a surrounding terminal apparatus based on a received signal intensity, however, the present embodiment is not limited to this configuration. A distance from a surrounding terminal apparatus may be measured by a method used in a known distance-measuring system, such as a time of arrival (TOA) or an angle of arrival (AOA). In this case, the measurement unit 216 measures a distance between the own terminal apparatus and the other terminal apparatus.

Further, it may be configured to form a group based on received power values of radio signals received for a predetermined period of time from each of a plurality of terminal apparatuses and to determine the representative terminal apparatus in the group. If there is a terminal apparatus that has operated as the representative terminal apparatus until then in the group, the frame 302 including the other terminal apparatus identification information 307 which the terminal apparatus has transmitted is generated and transmitted. In the example illustrated in FIG. 1, the terminal apparatus A101 and the terminal apparatus B102, the terminal apparatus C103, the terminal apparatus D104, and the terminal apparatus E105, and the terminal apparatus F106 and the terminal apparatus G107 form groups respectively. Then, a terminal apparatus selected as the representative terminal apparatus in each group transmits the frame 302 including identification information of the other terminal apparatus in the group at a predetermined cycle. For example, if the terminal apparatus A101 becomes the representative terminal apparatus, the data generation unit 205 in the terminal apparatus A101 generates the frame 302 in which the identification information of the terminal apparatus A101 is arranged in the own terminal apparatus identification information 305, and the identification information of the terminal apparatus B102 is arranged in the other terminal apparatus identification information 307.

Representative selection information may be configured to be cyclically transmitted as an annunciation signal together with identification information. Further, an example for starting proxy transmission after transmitting and receiving a request message is described, however an apparatus that has become a representative terminal apparatus may spontaneously start transmission of identification information of the other terminal apparatus without getting an approval from the other terminal apparatus.

Further, according to the present exemplary embodiment, an example in which the representative terminal apparatus transmits by proxy identification information which the terminal apparatus cyclically notifies is described. In addition, the representative terminal apparatus may return a response including identification information of the other terminal apparatus that the representative terminal apparatus transmits by proxy, for example, according to an identification information request from the imaging apparatus 115. At that time, a terminal apparatus (a terminal apparatus other than the representative terminal apparatus) of which identification information is transmitted by proxy by the other terminal apparatus, does not respond to the identification information request from the imaging apparatus 115. However, if the terminal apparatus detects that the representative terminal apparatus does not respond by proxy, the terminal apparatus responds to the identification information request to notify the identification information of the own terminal apparatus. A probe request frame of IEEE 802.11 standard may be used for the identification information request. Further, a probe response frame of IEEE 802.11 standard may be used for a response to the identification information request.

According to the first exemplary embodiment, a terminal apparatus (a proxy transmission target) of which identification information is transmitted by proxy is determined based on received powers received during a predetermined period of time. As another exemplary embodiment, it may be configured to determine a proxy transmission target based on type information indicating type of public information published by the owners 108 to 114. The type of the public information can be classified into types such as, own blog uniform resource locator (URL), a recommended Japanese food restaurant, a recommended western food restaurant. The owners 108 to 114 set the respective public information pieces to be published to the server 118, and sets types of the public information pieces to the own terminal apparatuses. Each of the types of the public information pieces is assigned type information as a unique identifier. The terminal apparatus transmits the identification information including the type of the public information associated with the identification information as well.

FIG. 6 illustrates communication frames generated by the data generation unit 205 according to the present exemplary embodiment. A frame 1001 is generated before determination of a representative terminal apparatus. The frame 1001 of the present exemplary embodiment has a configuration in which type information 1004 is added following the header 304 of the frame 301. A frame 1002 is generated by the terminal apparatus that has become the representative terminal apparatus, after determination of the representative terminal apparatus. According to the present exemplary embodiment, a group of terminal apparatuses with the same type information is formed, and the representative terminal apparatus selected in the group transmits the frame 1002. The frame 1002 has a configuration in which the type information 1004 is added following the header 304 of the frame 302. A frame 303 generated by each terminal apparatus at the time of determination of the representative terminal apparatus is similar to that in the first exemplary embodiment, and therefore description thereof will not be repeated.

As the processing for determining proxy transmission target using the types of the public information, in step S505 in FIG. 5, the determination unit 210 stores type information, in addition to the identification information received from surrounding terminal apparatuses, the received powers, and the received power change amounts by being associated with one another. Then, the determination unit 210 determines the terminal apparatuses of which received powers and received power change amounts are equal to or smaller than a predetermined value, and type information matches the one which the own terminal apparatus transmits as a group, and notifies the discrimination unit 212 of the group.

FIG. 7 illustrates information stored by the determination unit 210 which stores the type of public information together. In FIG. 7, information stored in the determination unit 210 in the terminal apparatus D104 before determination of the representative terminal apparatus is illustrated as an example. In FIG. 7, type information 1, type information 2, and type information 3 respectively correspond to a blog URL, a recommended Japanese food restaurant, and a recommended western food restaurant. In this case, it is assumed that the terminal apparatus D104 transmits the type information 2.

In this case, the determination unit 210 in the terminal apparatus D104 determines a terminal apparatus in which, for example, the received power is −50 dBm or over and an absolute value of the received power change amount is 1 dBm/sec or less, and which has the same type information 2, namely only the terminal apparatus E as a group, and notifies the discrimination unit 212 of the group. As a result of the operation of the determination unit 210, grouping is performed based on a position, a relative position including movement, and type information. Then, the representative terminal apparatus selected within the group will transmit the frame 1002.

As described above, the configuration capable of determining a proxy transmission target using the type of public information enables the owner 116 of the imaging apparatus 115 to instruct the imaging apparatus 115 to execute superposition display on which the public information of a desired predetermined type is superimposed. For example, when the imaging apparatus 115 is instructed to execute superposition display of the type information 2, i.e., the recommended Japanese food restaurant, for example, the imaging apparatus 115 checks type information in the frames transmitted by the terminal apparatuses 101 to 107. Then, if the type information 2, i.e., the recommended Japanese food restaurant, is included in the frame, the imaging apparatus 115 continues the reception of the identification information followed by the type information.

On the other hand, if the type information 2, i.e., the recommended Japanese food restaurant is not included in the frame, the imaging apparatus 115 stops the reception operation. In this way, the imaging apparatus 115 can stop the reception operation when the unnecessary frame is received based on the type information in the received frame, and thus efficient use of power consumption can be achieved. Accordingly, the system power efficiency can be further enhanced.

When execution of superposition display of arbitrary type attribute information is instructed, the imaging apparatus 115 may request identification information only from the terminal apparatuses 101 to 107 that transmit type information of the relevant type. In this case, since only the terminal apparatus that transmits the type information of the relevant type, or the representative terminal apparatus that transmits the type information of the relevant type will transmit the frame, the system power efficiency can be further enhanced.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-050683 filed Mar. 7, 2012, which is hereby incorporated by reference herein in its entirety.

What is claimed is:

1. A communication apparatus comprising:
a detection unit configured to detect received powers of a plurality of radio signals including a first radio signal and a second radio signal and received during a first predetermined time period from another apparatus;
a transmission unit configured to transmit by proxy identification information of the another apparatus; and
a prohibition unit configured to prohibit transmission of the identification information of the another apparatus by the transmission unit in a case where a change amount of received power between a first received power of the first radio signal and a second received power of the second radio signal received after the first radio signal is received is larger than a first predetermined value and the communication apparatus determines that a distance between the communication apparatus and the another apparatus is shortened in the first predetermined time period based on the change amount of received power.

2. The communication apparatus according to claim 1, further comprising a determination unit configured to determine whether change amounts of the received powers of the plurality of radio signals received during the first predetermined time period fall below the first predetermined value,
wherein, if the change amount of the received powers of the plurality of radio signals received during the first predetermined time period fall below the first predetermined value, the transmission unit transmits by proxy the identification information of the another apparatus.

3. The communication apparatus according to claim 1, further comprising a determination unit configured to determine whether an average value of the received powers of the plurality of radio signals received during the first predetermined time period exceeds a second predetermined value,
wherein, if the average value of the received powers of the plurality of radio signals received during the first predetermined time period exceeds the second predetermined value, the transmission unit determines to transmit by proxy the identification information of the another apparatus.

4. The communication apparatus according to claim 1, further comprising a determination unit configured to determine whether to transmit by proxy the identification information of the another apparatus based on a detection result of the detection unit,
wherein, if proxy transmission is requested from the another apparatus of which identification information determined to be transmitted by proxy by the determination unit, the transmission unit transmits by proxy the identification information of the another apparatus.

5. The communication apparatus according to claim 1, wherein, if a second predetermined time period has elapsed after starting proxy transmission of the identification information of the another apparatus, the transmission unit stops the proxy transmission.

6. The communication apparatus according to claim 1, wherein if a stoppage of proxy transmission is requested from the another apparatus after starting the proxy transmission of the identification information of the another apparatus, the transmission unit stops the proxy transmission.

7. The communication apparatus according to claim 1, further comprising a determination unit configured to determine which of the another apparatus and the communication apparatus transmits by proxy identification information based on a detection result of the detection unit, the received powers of the plurality of radio signals received during the first predetermined time period, a state of the communication apparatus, and a state of the another apparatus,
wherein the transmission unit transmits by proxy the identification information of the another apparatus according to determination by the determination unit.

8. The communication apparatus according to claim 7, wherein the transmission unit transmits the identification information of the communication apparatus, and
the communication apparatus further comprising a stopping unit configured, if the determination unit determines that the another apparatus transmits by proxy identification information of the communication apparatus, to stop transmission of the identification information of the communication apparatus.

9. The communication apparatus according to claim 7, wherein the determination unit determines which of the another apparatus and the communication apparatus transmits by proxy identification information based on a remaining amount of a battery of the communication apparatus and a remaining amount of a battery of the another apparatus.

10. The communication apparatus according to claim 7, wherein the determination unit determines which of the another apparatus and the communication apparatus transmits by proxy identification information based on whether the communication apparatus and the another apparatus cyclically transmit information.

11. The communication apparatus according to claim 7, wherein the determination unit determines which of the another apparatus and the communication apparatus transmits by proxy identification information based on whether the communication apparatus or the another apparatus transmits by proxy identification information of a different apparatus.

12. The communication apparatus according to claim 1, further comprising: a determination unit configured, based on received powers of a plurality of radio signals received from each of a plurality of other apparatuses during the first predetermined time period, to determine whether to transmit by proxy identification information of each of the plurality of other apparatuses,
wherein the transmission unit transmits by proxy the identification information of each of the plurality of other apparatuses according to determination by the determination unit.

13. The communication apparatus according to claim 1, further comprising a determination unit configured to determine whether to transmit by proxy identification information of the another apparatus based on a detection result by the detection unit, and a type of information included in the radio signals received during the first predetermined time period from the another apparatus,
wherein the transmission unit transmits by proxy the identification information of the another apparatus according to determination by the determination unit.

14. The communication apparatus according to claim 13, wherein the determination unit is configured to determine to transmit by proxy the identification information of the another apparatus in a case where the type of information received from the another apparatus is same as a type of information transmitted from the communication apparatus.

15. The communication apparatus according to claim 1, further comprising:
a determination unit configured to determine whether to transmit by proxy the identification information of the another apparatus based on a detection result of the detection unit; and
a control unit configured to control a back-off time in a case of starting data transmission according to determination of the determination unit.

16. A communication apparatus comprising:
a determination unit configured to determine amount change based on a change amount or received power of a distance in a predetermined time period between the communication apparatus and another apparatus based on a change amount of received power;
a transmission unit configured to transmit by proxy identification information of the another apparatus; and
a prohibition unit configured to prohibit transmission of the identification information of the another apparatus by the transmission unit in a case where the change amount, determined by the determination unit, of the distance between the communication apparatus and the another apparatus indicate that the distance between the communication apparatus and the another apparatus is shorter than a first predetermined value in the predetermined time period.

17. A method for controlling a communication apparatus, the method comprising:
detecting received powers of a plurality of radio signals including a first radio signal and a second radio signal and received during a first predetermined time period from another apparatus;
transmitting by proxy identification information of the another apparatus; and
prohibiting transmission of the identification information of the another apparatus in a case where a change amount of received power between a first received power of the first radio signal and a second received power of the second radio signal received after the first radio signal is received is larger than a first predetermined value and the communication apparatus determines that a distance between the communication apparatus and the another apparatus is shortened in the first predetermined time period based on the change amount of received power.

18. A non-transitory computer-readable storage medium storing a program for causing a computer of a communication apparatus to execute a method comprising:
detecting received powers of a plurality of radio signals including a first radio signal and a second radio signal and received during a first predetermined time period from another apparatus;
transmitting by proxy identification information of the another apparatus; and prohibiting transmission of the identification information of the another apparatus in a case where a change amount of received power between a first received power of the first radio signal and a second received power of the second radio signal received after the first radio signal is received is larger than a first predetermined value and the communication apparatus determines that a distance between the communication apparatus and the another apparatus is shortened in the first predetermined time period based on the change amount of received power.

19. A method for controlling a communication apparatus, the method comprising:
   determining a change amount of a distance between the communication apparatus and another apparatus in a predetermined time period based on a change amount of received power;
   transmitting by proxy identification information of the another apparatus; and
   prohibiting transmission of the identification information of the another apparatus in a case where the change amount, determined in the determining step, of the distance between the communication apparatus and the another apparatus indicate that the distance between the communication apparatus and the another apparatus is shorter than a first predetermined value in the predetermined time period.

20. A non-transitory computer-readable storage medium storing a program for causing a computer of a communication apparatus to execute a method comprising:
   determining a change amount of a distance between the communication apparatus and another apparatus in a predetermined time period based on a change amount of received power;
   transmitting by proxy identification information of the another apparatus; and
   prohibiting transmission of the identification information of the another apparatus in a case where the change amount, determined in the determining step, of the distance between the communication apparatus and the another apparatus indicate that the distance between the communication apparatus and the another apparatus is shorter than a first predetermined value in the predetermined time period.

* * * * *